Patented Aug. 7, 1945

2,380,997

UNITED STATES PATENT OFFICE 2,380,997

CONTACT MASSES

Winton I. Patnode, Schenectady, N. Y., assignor to General Electric Company, a corporation of New York No Drawing. Application September 26, 1941, Serial No. 412,461

7 Claims. (Cl. 252—225)

This invention relates to contact masses and more particularly is concerned with the production of solid, porous contact masses especially adapted to be used in effecting chemical reaction between silicon and a hydrocarbon halide in vapor or liquid state, for example vapors of methyl chloride, liquid chlorobenzene, etc.

The contact masses of this invention may be produced, for example, by molding a mixture comprising essentially silicon and a metallic catalyst, specifically copper, for the reaction between silicon and a hydrocarbon halide. In a preferred embodiment of the invention the solid, porous mass initially obtained, as by molding a mixture of comminuted silicon and comminuted copper or other metallic catalyst, is fired in a reducing atmosphere at a temperature sufficiently high and for a period sufficiently long to activate the potentially active catalyst, if initially it is catalytically inactive, or to increase its activity, if initially it is not so catalytically active as may be desired. This heat treatment increases the hardness and mechanical strength of the contact mass, but is not so drastic as to cause the porous mass to be converted into a non-porous body. During this firing treatment any reducible components, e. g., metallic oxides, in the contact mass are reduced. The fired mass is cooled in a non-oxidizing atmosphere to a temperature at or approaching normal temperatures. The mass conveniently may be cooled in the same reducing atmosphere in which it was fired; or, it may be cooled in an inert atmosphere such as nitrogen.

The products of the present invention are especially suitable for use in preparing organosilicon halides, e. g., methyl silicon chlorides, as disclosed and claimed in the copending application of Eugene G. Rochow, Serial No. 412,459, and Eugene G. Rochow and Winton I. Patnode, Serial No. 412,460, filed concurrently herewith and assigned to the same assignee as the present invention.

The proportions of components constituting my new contact masses may be varied considerably. Preferably, however, the solid, porous masses consist substantially of a preponderant proportion of silicon and a minor proportion of copper or other metallic catalyst for the reaction between silicon and a hydrocarbon halide. A more specific example of a contact mass of this invention is the product of firing under reducing conditions a molded mixture of, by weight, from 2 to 45 per cent powdered metallic catalyst, specifically copper, and from 98 to 55 per cent powdered silicon. Particularly good results from a practical standpoint are obtained with a solid, porous contact mass produced by firing under reducing conditions a molded mixture of, by weight, from 5 to 25 per cent powdered copper or other metallic catalyst and from 95 to 75 per cent powdered silicon.

In order that those skilled in the art better may understand how the present invention may be carried into effect, the following illustrative examples thereof are given. All parts are by weight.

Example 1

Silicon is crushed to a suitable degree of fineness, for example to a particle size such that practically all of it will pass through a standard 60-mesh screen. The comminuted silicon is mixed with comminuted copper, preferably freshly reduced copper, in the approximate ratio of 9 parts of the former to 1 part of the latter. The comminuted copper also advantageously is of such particle size that substantially all of it will pass through a standard 60-mesh screen.

Solid, porous masses of suitable size are made by compressing portions of the uniform mixture of copper and silicon powders under a pressure sufficiently high that the pressed mass will have adequate hardness for handling in subsequent operations without breaking or pulverizing to an objectionable extent. For example, when the mixed powders are made into the form of cylindrical pills or pellets about ½-inch in diameter and from ¼- to ⅜-inch in height, the mixed powders satisfactorily are pelleted under a pressure of the order of 50,000 to 70,000 pounds or more per square inch.

The solid, porous, molded contact mass produced as above described advantageously is fired in a reducing atmosphere. During this heat treatment an alloy of the silicon and copper may form. A preferred procedure consists in firing the mass in hydrogen at suitable temperatures, for instance at temperatures of the order of 700° to 1060° C. Firing in hydrogen for a short period of the order of 10 or 15 minutes up to 3 hours at approximately 1050° C. usually gives good results. Instead of hydrogen, other reducing atmospheres may be employed.

Alternatively, the mixed powders may be fired in bulk in a reducing atmosphere at a temperature sufficiently high to effect sintering thereof and to impart rigidity thereto. The fired mass then is broken up to obtain porous lumps of a desired size.

*Example 2*

Same as Example 1 with the exception that the powdered silicon is mixed with freshly reduced copper powder in the approximate ratio of 8 parts of the former to 2 parts of the latter.

*Example 3*

Same as Example 1 with the exception that the powdered silicon is mixed with nickel powder in the approximate ratio of 8 parts of the former to 2 parts of the latter. The solid, porous contact mass may be fired at temperatures above 1050° C., if desired, for example at temperatures as high as 1425° C.

*Example 4*

A mixture of 90 parts powdered silicon and 10 parts powdered copper is molded in the form of pellets under a pressure of the order of 60,000 pounds per square inch. Silicon and copper of 300 to 400 mesh fineness are used. A porous, solid contact mass suitable for use in effecting reaction between silicon and a hydrocarbon halide, specifically methyl chloride, is produced.

It will be understood, of course, by those skilled in the art that this invention is not limited to the production of contact masses comprising copper and silicon as in Examples 1, 2 and 4 or nickel and silicon as in Example 3. Thus, instead of copper or nickel any other metal having a catalytic effect upon the reaction between silicon and a hydrocarbon halide may be brought into intimate association with silicon to form the new solid, porous contact masses of this invention. Examples of such metals, in addition to copper and nickel, are tin, antimony, manganese, silver and titanium.

Other examples of solid, porous contact masses that may be produced in accordance with the present invention are disclosed in Rochow and Patnode copending application Serial No. 412,460.

What I claim as new and desire to secure by Letters Patent of the United States is:

1. A solid, porous contact mass adapted to be used in effecting chemical reaction between silicon and a hydrocarbon halide, said mass comprising essentially silicon and a metallic catalyst for the said reaction.

2. A solid, porous, molded contact mass consisting essentially of silicon and copper, said mass being adapted to be used in effecting chemical reaction between silicon and a hydrocarbon halide.

3. A solid, porous, molded contact mass for use in effecting chemical reaction between silicon and a hydrocarbon halide, said mass consisting substantially of a preponderant proportion of silicon and a minor proportion of a metallic catalyst for the said reaction.

4. A solid, porous contact mass adapted to be used in effecting chemical reaction between silicon and a hydrocarbon halide, said mass being the product of firing under reducing conditions a molded mixture of powdered silicon and a powdered metallic catalyst for the said reaction.

5. A solid, porous contact mass for use in effecting chemical reaction between silicon and a hydrocarbon halide, said mass being the product of firing under reducing conditions a molded mixture of, by weight, from 2 to 45 per cent powdered copper and from 98 to 55 per cent powdered silicon.

6. The method of producing a solid, porous contact mass adapted to be used in effecting chemical reaction between silicon and a hydrocarbon halide, said method comprising molding a mixture comprising essentially silicon and a metallic catalyst for the said reaction, firing the molded mass at an elevated temperature in a reducing atmosphere, and cooling the fired mass in a non-oxidizing atmosphere.

7. The method of producing a solid, porous contact mass adapted to be used in effecting chemical reaction between silicon and a hydrocarbon halide, said method comprising molding a mixture of, by weight, from 2 to 45 per cent powdered copper and from 98 to 55 per cent powdered silicon, firing the molded mixture at a temperature of the order of 700° to 1060° C. for a period sufficient to increase the catalytic activity of the copper and the strength of the molded mass, and cooling the fired mass in a non-oxidizing atmosphere.

WINTON I. PATNODE.